US008433130B2

(12) United States Patent
Rau et al.

(10) Patent No.: US 8,433,130 B2
(45) Date of Patent: Apr. 30, 2013

(54) METHODOLOGY TO OPTIMIZE AND PROVIDE STREAMING OBJECT ROTATION USING COMPOSITE IMAGES (75) Inventors: Aaron Rau, Millbrae, CA (US); Tim Lin, E. San Mateo, CA (US); Craig Somberg, Lafayette, CA (US)

(73) Assignee: Vergence Media, Inc., Millbrae, CA (US)

( * ) Notice: Subject to any disclaimer, the term of this patent is extended or adjusted under 35 U.S.C. 154(b) by 927 days.

(21) Appl. No.: 12/524,706

(22) PCT Filed: Jan. 29, 2008

(86) PCT No.: PCT/US2008/052282
§ 371 (c)(1),
(2), (4) Date: Jul. 27, 2009

(87) PCT Pub. No.: WO2008/094892
PCT Pub. Date: Aug. 7, 2008

(65) Prior Publication Data
US 2010/0284605 A1 Nov. 11, 2010

Related U.S. Application Data (60) Provisional application No. 60/898,058, filed on Jan. 29, 2007.

(51) Int. Cl.
*G06K 9/00* (2006.01)
(52) U.S. Cl.
USPC ............ 382/154; 345/419; 382/285; 382/293
(58) Field of Classification Search .................. 345/419; 382/107, 154, 293
See application file for complete search history.

(56) References Cited

U.S. PATENT DOCUMENTS

| | | | | |
|---|---|---|---|---|
| 5,872,858 A | * | 2/1999 | Kamada et al. | 382/107 |
| 6,104,840 A | * | 8/2000 | Ejiri et al. | 382/284 |
| 6,205,243 B1 | * | 3/2001 | Migdal et al. | 382/154 |
| 6,215,494 B1 | | 4/2001 | Teo | |
| 6,222,549 B1 | | 4/2001 | Hoddie | |
| 6,393,142 B1 | * | 5/2002 | Swain et al. | 382/154 |
| 6,628,819 B1 | * | 9/2003 | Huang et al. | 382/154 |
| 7,474,803 B2 | * | 1/2009 | Petrov et al. | 345/419 |
| 7,565,005 B2 | * | 7/2009 | Sawada | 382/154 |
| 2002/0106135 A1 | * | 8/2002 | Iwane | 382/305 |

(Continued)

*Primary Examiner* — Gregory M Desire
(74) *Attorney, Agent, or Firm* — Michael A. Glenn; Glenn Patent Group (57) ABSTRACT

Optimizing and presenting various sequences of images and/or photographs for viewing with a Web browser, is accomplished without the necessity of loading the entire image set, for example in connection with the 3D display of a product of interest. To represent an object that is rotating, a set of images must be taken. These images are taken at various angles, typically using either using a fixed camera or a turntable. The illusion of an object being rotated is created when the captured images based on the angle being viewed are displayed. To ensure a seamless rotation of an object, a technique is taught that significantly concentrates on reducing the loading time of the captured images by prioritizing which images should be transferred first according to their size, and their number of object views or view angles. A seamless rotation is thus achieved while less than the total number of images is loaded. In fact, an embodiment of the invention teaches that, by selectively loading certain images with specific angular values, it is possible to achieve an object rotation, i.e. using horizontal and vertical adjacent images positioning.

20 Claims, 6 Drawing Sheets

U.S. PATENT DOCUMENTS

| | | |
|---|---|---|
| 2003/0071194 A1* | 4/2003 | Mueller et al. ............. 250/208.1 |
| 2003/0137506 A1* | 7/2003 | Efran et al. .................. 345/419 |
| 2005/0149865 A1 | 7/2005 | Wang et al. |
| 2005/0271299 A1* | 12/2005 | Ajito et al. .................... 382/293 |
| 2007/0019000 A1 | 1/2007 | Motomura et al. |
| 2010/0007715 A1* | 1/2010 | Lai et al. ........................ 348/37 |

* cited by examiner

| 12 | 25 |
|---|---|
| 30 | 44 |

Fig. 3b

| 13 | 45 |
|---|---|
| 27 | 33 |

Fig. 3d

| 15 | 21 |
|---|---|
| 30 | 31 |
| 40 | 41 |

| 16 | 14 | 20 |
|---|---|---|
| 23 | 25 | 35 |
| 33 | 34 | 46 |

Fig. 3c

| 22 | 23 |
|---|---|
| 32 | 33 |
| 42 | 43 |

| 12 | 25 |
|----|----|
| 30 | 44 |

| 13 | 45 |
|----|----|
| 27 | 33 |

| 16 | 14 | 20 |
|----|----|----|
| 23 | 25 | 35 |
| 33 | 34 | 46 |

| 15 | 21 |
|----|----|
| 30 | 31 |
| 40 | 41 |

| 00 | 01 | 02 | 03 | 04 | 05 | 06 | 07 | 08 |
|----|----|----|----|----|----|----|----|----|
| 10 | 11 | 12 | 13 | 14 | 15 | 16 | 17 | 18 |
| 20 | 21 | 22 | 23 | 24 | 25 | 26 | 27 | 28 |
| 30 | 31 | 32 | 33 | 34 | 35 | 36 | 37 | 38 |
| 40 | 41 | 42 | 43 | 44 | 45 | 46 | 47 | 48 |

METHODOLOGY TO OPTIMIZE AND PROVIDE STREAMING OBJECT ROTATION USING COMPOSITE IMAGES

CROSS REFERENCE TO RELATED APPLICATIONS

This application is a U.S. National Phase entry of PCT Serial No. PCT/US2008/52282 filed 29 Jan. 2008, which claims priority to U.S. provisional patent application Ser. No. 60/898,058, filed 29 Jan. 2007, the entirety of which is incorporated herein by this reference thereto.

BACKGROUND OF THE INVENTION

1. Technical Field

The invention related to the display of three dimensional images. More particularly, the invention relates to methodology to optimize and provide streaming object rotation using composite images. Still more particularly, the invention relates to an innovative method to create and render three-dimensional (3D) representations of a product using photographs for online and offline viewing with a Web browser.

2. Description of the Prior Art

Various methods have been applied in the past to try and represent products in 3D. These methods range from 3D scanning, modeling, and imaging to photography. Such scanning, modeling, and imaging have often been deployed to create CAD renderings of a product. Although this method can create accurate 3D models of a product, it fails to recreate the life-like textures and details that can be often captured with photography. Even if textural mappings are applied, the resulting image often lacks the realism that can be seen from a single photograph. Often times, for the viewer to see the entire 3D model, the entire model and texture information must be loaded to memory and/or downloaded before presentation is possible. This is a very slow process that discourages viewers from waiting until the model gets loaded.

Using photographs to represent to represent a product in 3D is not a new concept. QuickTime VR Object, X3D, Java 3D, and various Flash-based applications load individual images of a product. Each image represents a different view angle. Then these images are presented to the viewer in a specific sequence based on the order in which they were taken. The term "360 Spin" is often used to represent this concept. One limitation with this method is that no optimization algorithms have been applied to the sequence in which the images are presented to a viewer. The entire image set also must be loaded to memory and/or downloaded before presentation is possible. This can range from 36 images to as many as 720 images. This limitation and lack of optimization often results in lengthy load times.

In the context of overcoming these limitations and lack of optimization, it would be advantageous to provide a new methodology for optimizing and providing object rotation.

SUMMARY OF THE INVENTION

As noted above, one of the most difficult challenges in the online realm is to provide a 3D representation of a product, such as furniture, toys, shoes, etc. Current implementations use 3D modeling in Java or Flash, while others use photographs stitching in QuickTimeVR. These various implementations often require extensive load times even on a broad band connection. A presently preferred embodiment of the invention reduces the need for extensive load times by providing a technique for streaming a set of images to a browser. This technique is platform independent, and can therefore be implemented in any known format, such as Flash, JavaScript, and Java.

An embodiment of the invention provides a method and apparatus for optimizing and presenting various sequences of images and/or photographs for viewing with a Web browser, and without the necessity of loading the entire image set, for example in connection with the 3D display of a product of interest.

Typically, to represent an object that is rotating, a set of images must be taken. These images are taken at various angles, typically using either using a fixed camera or a turntable. The illusion of an object being rotated is created when the captured images based on the angle being viewed are displayed.

To ensure a seamless rotation of an object, the invention provides a technique that significantly concentrates on reducing the loading time of the captured images by prioritizing which images should be transferred first according to their size, and their number of object views or view angles. A seamless rotation is thus achieved while less than the total number of images is loaded. In fact, an embodiment of the invention teaches that, by selectively loading certain images with specific angular values, it is possible to achieve an object rotation, i.e. using horizontal and vertical adjacent images positioning.

This innovative approach overcomes any limitations and lack of optimization currently experienced when dealing with object rotation. By using the invention, a user is able to optimize and provide streaming object rotation without imposing performance hits and unnecessary complexity.

DETAILED DESCRIPTION OF THE INVENTION

To represent an object that is rotating, images must be taken at various angles. This is often achieved through the use of a fixed camera and a turntable. Once the images have been taken and the angular information is stored, then object rotation is achieved by displaying the captured images based on the angle being viewed.

The invention provides a more seamless rotation when viewing the object by significantly reducing initial load time. This is achieved by prioritizing which images should be transferred first and transferring a few large composite images composed of several object views.

Figure 1:
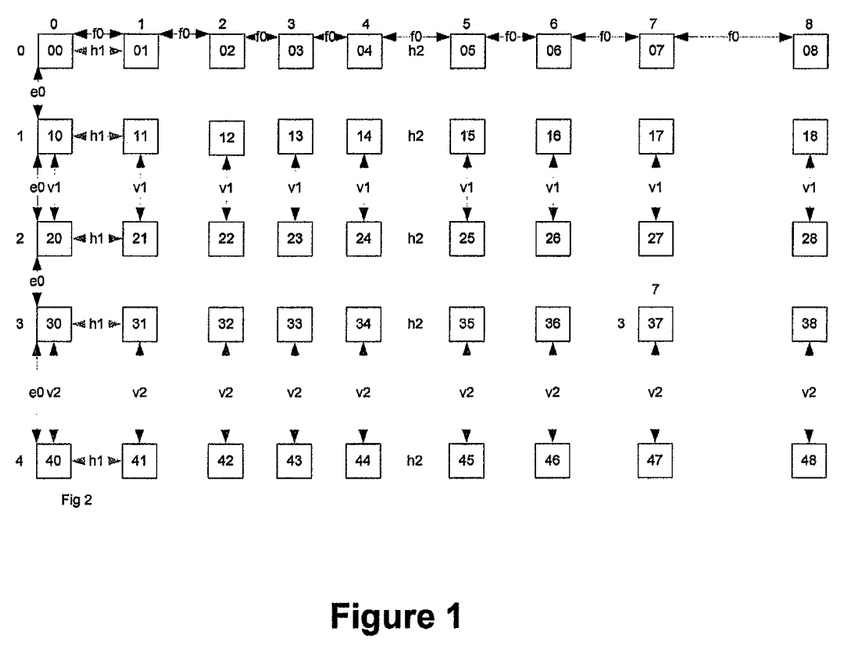
FIG. 1 is a block diagram that illustrates a specific set of inaccuracies that can occur in an image and/or photograph capturing and organization process while still retaining the illusion of the viewing an object in 3D according to the invention.

This invention states that the specific angular values, i.e. 10 degrees horizontal and 20 degrees vertical, are not necessary to achieve object rotation. Only horizontal and vertical adjacent images positioning are necessary to achieve this. FIG. 1 is a block diagram that illustrates a specific set of inaccuracies that can occur in an image and/or photograph capturing and organization process while still retaining the illusion of the viewing an object in 3D according to the invention. Thus, FIG. 1 illustrates adjacent views at various longitude and latitude. These views are labeled 00, 01, 02, 03 . . . 45, 46, and 47, etc. They are organized into columns and rows to represent longitude and latitude positions. The distance between each view (labeled f0, e0, v1, h1, v2, h2) represents the angular difference between each view. Values may differ between columns, but not within each individual column. Value may differ between rows, but not within each individual row. The image reference can simply be stored in a master M×N matrix to retain the adjacent image positioning. By traversing the M×N matrix from one cell to an adjacent cell referencing the corresponding images the object can appear to rotate.

Figure 2A:
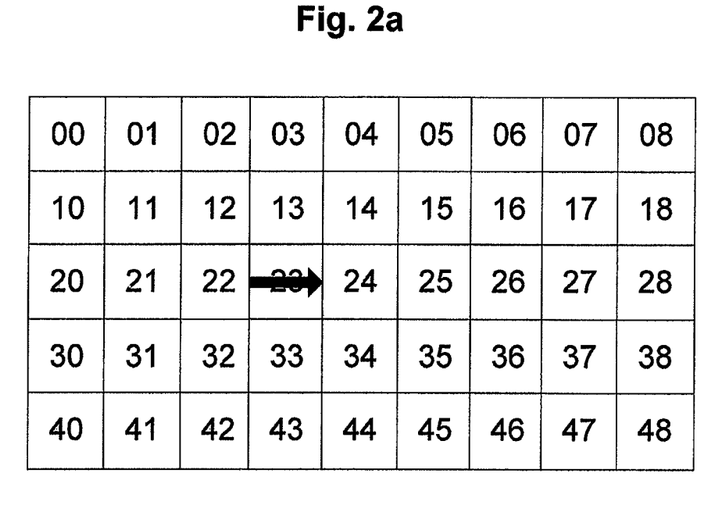
FIG. 2 is a table that illustrates how the 3D viewing of an object is achieved by displaying the proper images from a specific angle in the correct sequence (FIG. 2b), and also illustrates a process in which images from specific angles are organized in an N×N matrix (FIG. 2a) according to the invention.
Figure 2B:
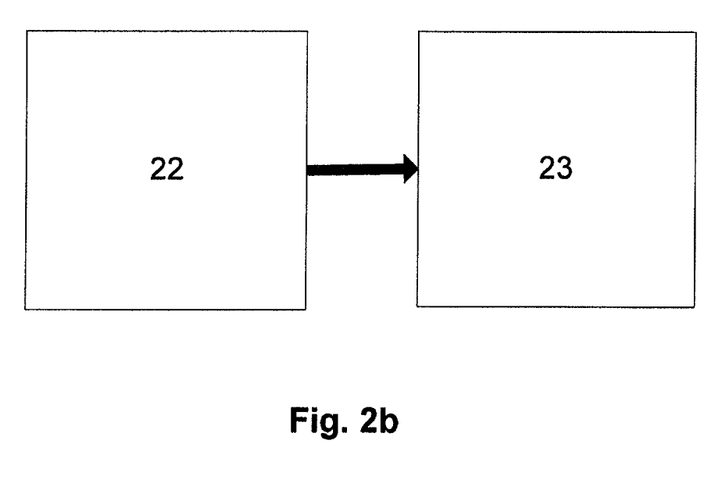
Figure 3A:
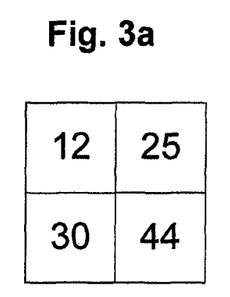
FIGS. 3a-3e provide a series of tables that illustrate various ways in which an image can be organized during the process of achieving object rotation according to the invention.
Figure 3B:
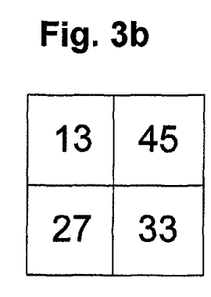
Figure 3C:
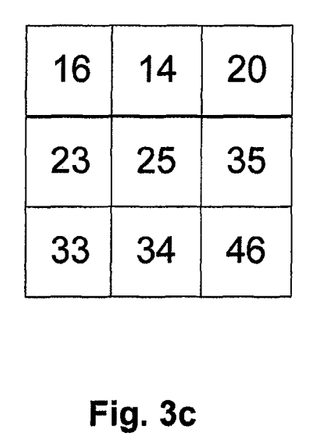
Figure 3D:
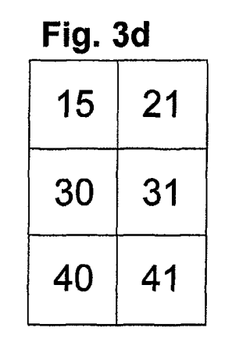
Figure 3E:
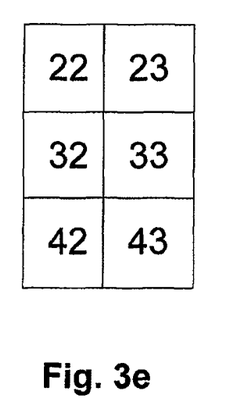
Figure 4A:
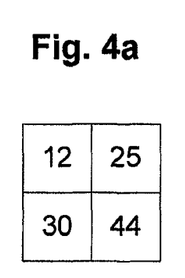
FIGS. 4a-4d provide a series of tables that illustrate the viewing of an object from images organized in accordance with FIGS. 3a-3d, based upon a particular sequence of images (FIG. 4e) according to the invention.
Figure 4B:
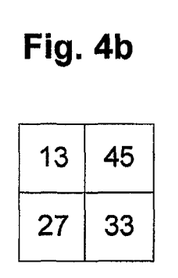
Figure 4C:
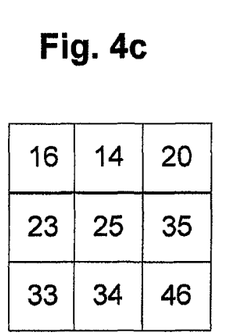
Figure 4D:
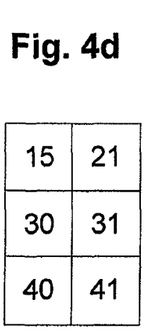
Figure 4E:
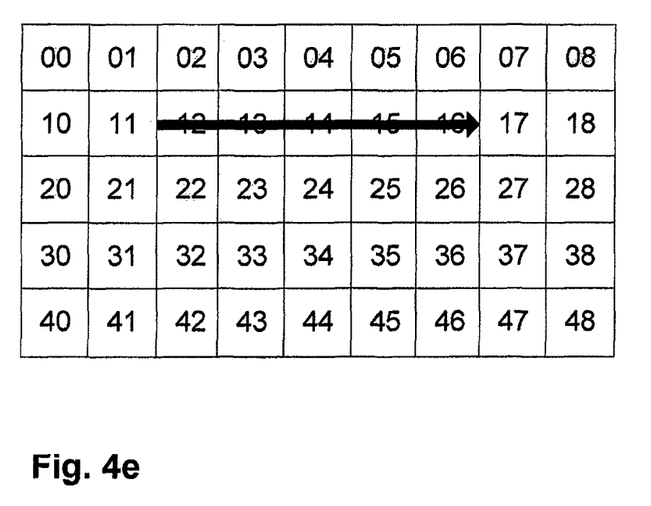
Figure 5A:
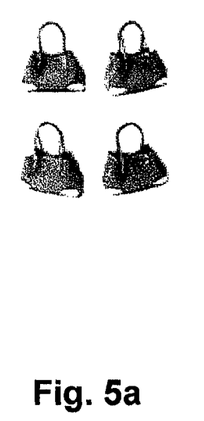
FIG. 5 provides specific examples that show what a series of images in accordance with FIGS. 3a-3d (see FIGS. 5a-5d), and 2 (see FIG. 5e) would look like according to the invention.
Figure 5B:
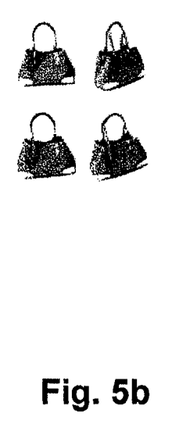
Figure 5C:
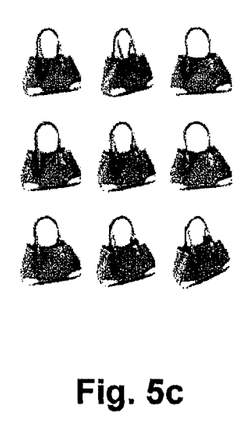
Figure 5D:
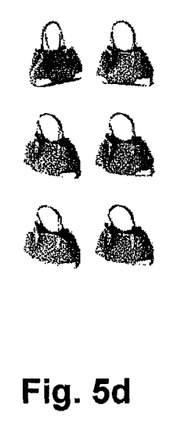
Figure 5E:
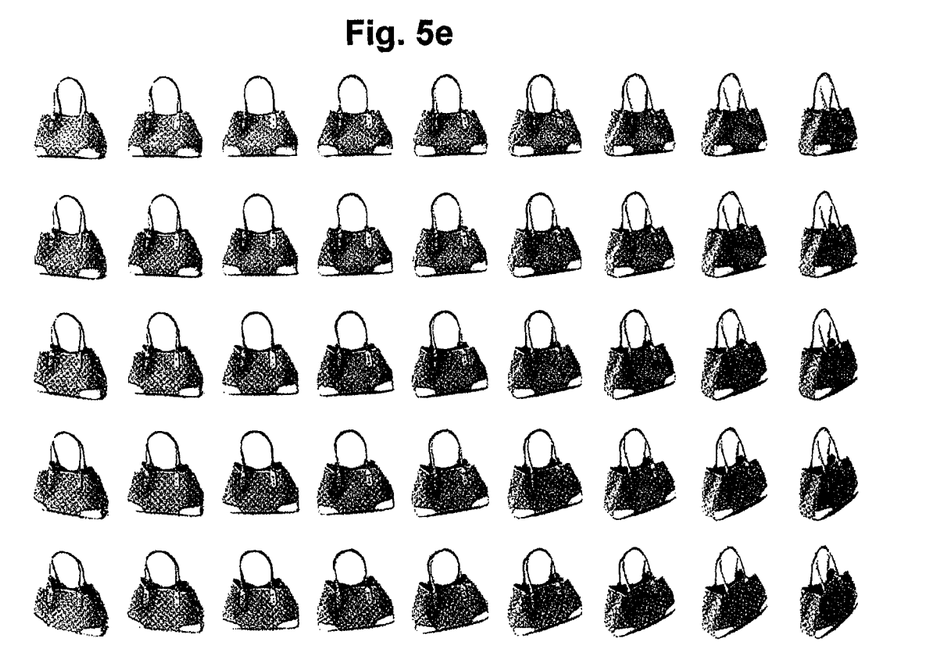

FIG. 2 is a table that illustrates how the 3D viewing of an object is achieved by displaying the proper images from a specific angle in the correct sequence (FIG. 2b), and also illustrates a process in which images from specific angles are organized in an N×N matrix (FIG. 2a) according to the invention. In particular, FIG. 2 illustrates rotating the object to the right from view 22 to view 23.

The invention also teaches that additional views of the same object at the same longitude and latitude can be represented by adding an additional dimension to the original master matrix to create another master, M× N×O.

In current object rotations, a single image contains a particular view. To display this particular view the corresponding image must be transferred. To prevent transferring each view individually as separate images during object rotation, a single image can be transferred containing multiple views using the master matrix format mentioned previously in conjunction with positioning information of that particular view within the image. FIGS. 3a-3e provide a series of tables that illustrate various ways in which an image can be organized during the process of achieving object rotation according to the invention. Thus, FIGS. 3a-3e illustrate several examples of a single image representing multiple views and the corresponding positioning information. To reduce complexity and optimize image size, another type of positioning M×N matrix is used. By traversing the master matrix and referencing positioning information in a positioning matrix the object appears to rotate.

FIGS. 4a-4d provide a series of tables that illustrate the viewing of an object from images organized in accordance with FIGS. 3a-3d, based upon a particular sequence of images (FIG. 4e) according to the invention. Thus, FIG. 4 illustrates traversing from view 13 to 16 using the smaller composite images and a larger composite image.

FIG. 5 provides specific examples that show what a series of images in accordance with FIGS. 3a-3d (see FIGS. 5a-5d), and 2 (see FIG. 5e) would look like according to the invention. Thus, FIG. 5 illustrates the actual images represented by FIGS. 2 and 3.

Furthermore, pre-buffer and priority algorithms can be used to prioritize composite image generation and loading based on any desired criteria. For example, when the view 12 on FIGS. 3a/4a is selected, the image represented by views 13, 14, 15, and 16 in FIGS. 3b/4b, and the views in FIGS. 3c/4c are loaded. Various optimal algorithms can be devised to specify which views must be contained in a particular composite image and what transfer priority it should receive as a user interacts to rotate an object.

The following is an exemplary list of algorithms that can be used in connection with the invention.

Image Composition Bandwidth Limit Algorithm Steps
1) Check the client's connection speed
2) Composite a smaller number of images into one image for slow connections and composite a higher number into one for faster connections.
   (a) The correlations between the numbers of composite images can be linearly or exponentially related to the connection speed.
3) Send the images and mapping matrix to the client.

Image Composition View Algorithm Steps
1. Composite set from views based only from front, left, right, back, top view
2. Next composite another set of views from halfway between front-left, front-right, front-top, back-right, back-left, back-top.
3. Keep compositing sets of views that is halfway between those views that have already been composited until all the views of rotation has been composited.
4. Send those views and mapping matrix to the client.

Send Sequencing Algorithm Steps
1) The sending sequences of the composite images can be determined by a ranking system base on a set of the following criteria such as but not limited to:
   a) The number of view/original image has been viewed the most,
   b) The ranking numbers manually specified by a system administrator.
   c) The ranking of view/original images based on how many different images correspond to a specific view angle/coordinate.
   d) The images that correspond to direction that a user rotates the object.
   e) The images with a specified radius of the correspond path that user is rotating the object.
      i) The path can be estimated based on the various directional control buttons, click and drag interface, and Bresenham algorithm to traverse the path on the N×M matrix.
2) Once the rank is determined from the set of criteria the composite images and the corresponding mappings matrix are created.
3) The mapping matrix is sent to the client
4) The composite image is sent over.

Figure 6:
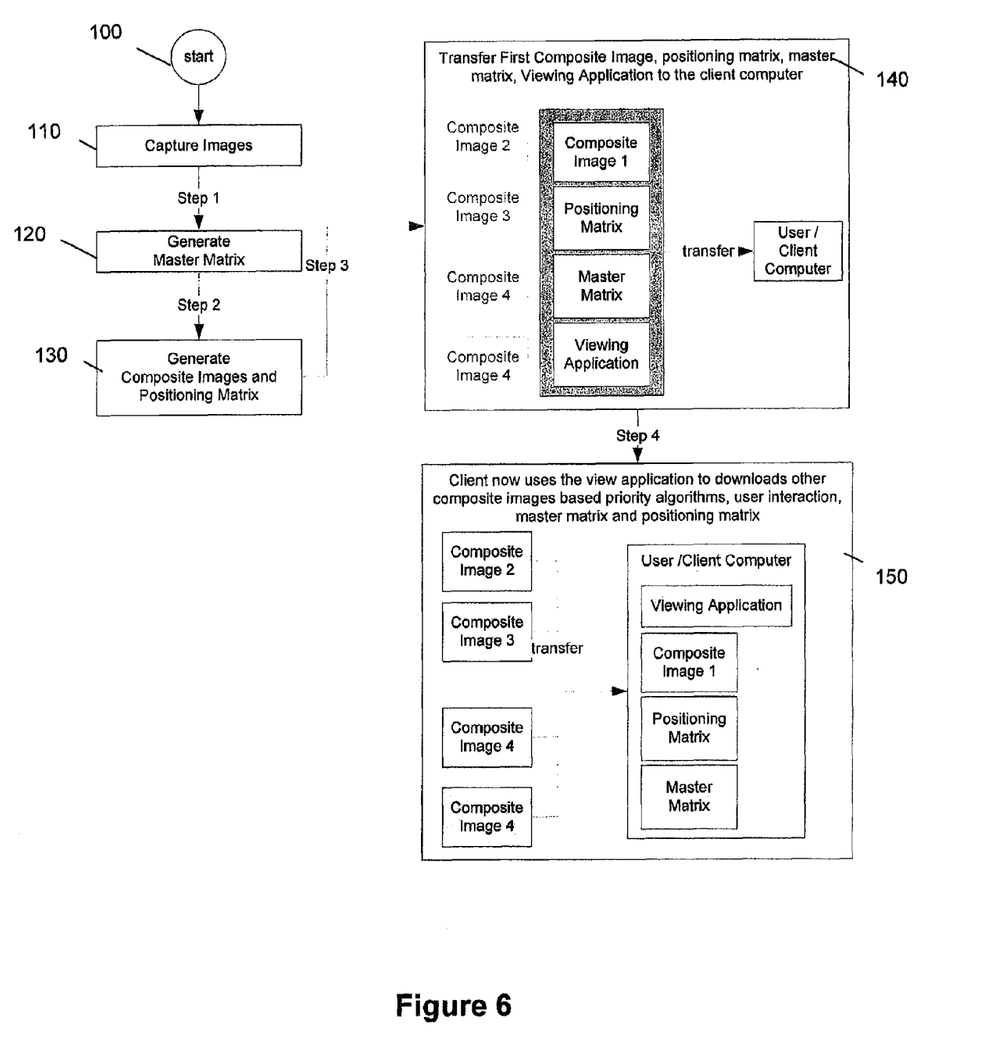
FIG. 6 is a flow diagram that illustrates the process in which images are captured, organized, and displayed to the viewer according to the invention.

FIG. 6 is a flow diagram that illustrates the process in which images are captured, organized, and displayed to the viewer according to the invention. Thus, FIG. 6 illustrates the entire process from image capturing, to composite image generation, and image delivery. The viewing application mentioned contains and executes various algorithms to prioritize and pre-buffer transfer of the composite images.

In FIG. 6, the process starts (100) and the images of an object are captured (110) using conventional techniques such as, for example but not by way of limitation, QuickTime VR Object Movie, Adobe Flash, and applications developed using X3D and Java 3D API.

During a first step, a master matrix is generated (120) as taught above.

During a second step, composite images and a positioning matrix are generated (130).

During a third step, a first composite image, positioning matrix, master matrix, and viewing application are transferred to the client computer (140).

During a fourth step, the client uses the viewing application to download other composite images based upon the priority algorithms and user interaction with the master matrix and positioning matrix (150).

One picture of the invention is described herein. A number of modifications and improvement may be made, but the rationale remains the same: to reach a seamless object rotation by reducing the loading time of the captured images. Therefore, it is important to understand that the invention is not limited to the capabilities described in the initial picture.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for optimizing and providing streaming object rotation, comprising the steps of:
   capturing images of an object from a plurality of angles that collectively depict three dimensional object rotation;
   storing an image reference in a master M×N matrix to retain adjacent image positioning;
   traversing said M×N matrix from one cell to an adjacent cell referencing corresponding images, wherein an object can appear to rotate;
   prioritizing which images should be transferred first when an image transfer is requested;
   wherein at least one of the steps above is performed on a computer; and
   transferring at least one large composite image composed of several object views.

2. The method of claim 1, further comprising the step of:
   representing additional views of a same object at a same longitude and latitude by adding an additional dimension to an original master matrix to create another master, M×N×O.

3. The method of claim 1, further comprising the step of:
   transferring a single image containing multiple views using said master matrix in conjunction with positioning information of that particular view within said image.

4. The method of claim 1, further comprising the steps of:
   providing a positioning M×N matrix; and
   traversing said master matrix and referencing positioning information in said positioning matrix;
   wherein said object appears to rotate.

5. The method of claim 1, said prioritizing step comprising the step of:
   applying a pre-buffer algorithm to prioritize composite image generation and loading based on at least one predetermined criterion.

6. The method of claim 1, said prioritizing step comprising the step of:
   applying a priority algorithm to prioritize composite image generation and loading based on at least one predetermined criterion.

7. The method of claim 1, said prioritizing step comprising the step of:
   applying an algorithm to specify which views must be contained in a particular composite image and what transfer priority it should receive as a user interacts to rotate an object.

8. A method for optimizing and providing streaming object rotation, comprising the steps of:
   using captured three dimensional images of an object from a plurality of angles that collectively depict three dimensional object rotation, wherein each angle of the plurality of angles and the distance of the object are known;
   generating composite images and a positioning matrix for said images based on said known plurality of angles and said known distance;
   generating a master matrix referencing the positioning matrix; and
   wherein at least one step is performed by a processor.

9. The method of claim 8, further comprising the step of:
   transferring a first composite image, said positioning matrix, said master matrix, and a viewing application to a client computer.

10. The method of claim 9, further comprising the step of:
    said client using said viewing application to download other composite images based upon priority algorithms and user interaction with said master matrix and said positioning matrix.

11. An apparatus for optimizing and providing streaming object rotation, comprising:
    means for capturing images of an object from a plurality of angles that collectively depict three dimensional object rotation;
    a master M×N matrix for storing an image reference to retain adjacent image positioning;
    means for traversing said M×N matrix from one cell to an adjacent cell referencing corresponding images, wherein an object can appear to rotate;
    means for prioritizing which images should be transferred first when an image transfer is requested; and
    means for transferring at least one large composite image composed of several object views.

12. The apparatus of claim 11, further comprising:
    means for representing additional views of a same object at a same longitude and latitude by adding an additional dimension to an original master matrix to create another master, M×N×O.

13. The apparatus of claim 11, further comprising:
    means for transferring a single image containing multiple views using said master matrix in conjunction with positioning information of that particular view within said image.

14. The apparatus of claim 11, further comprising:
    means for providing a positioning M×N matrix; and
    means for traversing said master matrix and referencing positioning information in said positioning matrix;
    wherein said object appears to rotate.

15. The apparatus of claim 11, said prioritizing means comprising:
    a pre-buffer algorithm to prioritize composite image generation and loading based on at least one predetermined criterion.

16. The apparatus of claim 11, said prioritizing means comprising:
    a priority algorithm to prioritize composite image generation and loading based on at least one predetermined criterion.

17. The apparatus of claim 11, said prioritizing means comprising:
    an algorithm to specify which views must be contained in a particular composite image and what transfer priority it should receive as a user interacts to rotate an object.

18. An apparatus for optimizing and providing streaming object rotation, comprising the steps of:
    means for using captured three dimensional images of an object from a plurality of angles that collectively depict object rotation, wherein each angle of the plurality of angles and the distance of the object are known;
    means for generating composite images and a positioning matrix for said images based on said known plurality of angles and said known distance; and
    a master matrix of said images referencing the positioning matrix.

19. The apparatus of claim 18, further comprising:
    means for transferring a first composite image, said positioning matrix, said master matrix, and a viewing application to a client computer.

20. The apparatus of claim 19, further comprising:
    means for said client using said viewing application to download other composite images based upon priority algorithms and user interaction with said master matrix and said positioning matrix.

\* \* \* \* \*